(12) United States Patent
Kutsovsky et al.

(10) Patent No.: US 7,780,938 B2
(45) Date of Patent: Aug. 24, 2010

(54) PRODUCTION OF SILICON THROUGH A CLOSED-LOOP PROCESS

(75) Inventors: Yakov E. Kutsovsky, Arlington, MA (US); Sheldon B. Davis, Nashua, NH (US)

(73) Assignee: Cabot Corporation, Boston, MA (US)

( * ) Notice: Subject to any disclaimer, the term of this patent is extended or adjusted under 35 U.S.C. 154(b) by 345 days.

(21) Appl. No.: 11/735,234

(22) Filed: Apr. 13, 2007

(65) Prior Publication Data

US 2007/0248521 A1 Oct. 25, 2007

Related U.S. Application Data

(60) Provisional application No. 60/791,640, filed on Apr. 13, 2006.

(51) Int. Cl.
*C01B 33/027* (2006.01)
*C01B 33/033* (2006.01)
*C01B 33/03* (2006.01)

(52) U.S. Cl. .................. 423/350; 423/348; 423/349
(58) Field of Classification Search .......... 423/348–350
See application file for complete search history.

(56) References Cited

U.S. PATENT DOCUMENTS

| | | | |
|---|---|---|---|
| 2,999,735 A | 9/1961 | Reuschel | |
| 3,041,145 A | 6/1962 | Aries | |
| 3,042,494 A | 7/1962 | Gutsche | |
| 3,120,451 A | 2/1964 | Schmidt et al. | |
| 3,146,123 A | 8/1964 | Bischoff | |
| 3,686,378 A | 8/1972 | Dietze | |
| 3,820,935 A | 6/1974 | Dietze | |
| 3,900,039 A | 8/1975 | Dietze et al. | |
| 3,979,490 A | 9/1976 | Dietze et al. | |
| 4,034,705 A | 7/1977 | Dietze et al. | |
| 4,035,460 A | 7/1977 | Dietze et al. | |
| 4,092,446 A | 5/1978 | Padovani et al. | |
| 4,102,298 A | 7/1978 | Dietze et al. | |
| 4,102,765 A | 7/1978 | Fey et al. | |
| 4,102,767 A | 7/1978 | Mazelsky et al. | |
| 4,117,094 A | 9/1978 | Blocher, Jr. et al. | |
| 4,123,989 A | 11/1978 | Jewett | |
| 4,125,643 A | 11/1978 | Reuschel et al. | |
| 4,139,438 A | 2/1979 | Fey et al. | |
| 4,148,931 A | 4/1979 | Reuschel et al. | |

(Continued)

FOREIGN PATENT DOCUMENTS

GB 2 028 289 A 3/1980

(Continued)

OTHER PUBLICATIONS

International Preliminary Report on Patentability dated Oct. 23, 2008, with respect to PCT/US2007/009242.

(Continued)

*Primary Examiner*—Timothy C Vanoy
*Assistant Examiner*—Diana J Liao

(57) ABSTRACT

The inventive method of producing silicon comprises reacting gaseous trichlorosilane with hydrogen to deposit silicon onto a substrate and to produce silicon tetrachloride by-product, vaporizing the silicon tetrachloride by-product to form gaseous silicon tetrachloride, converting the gaseous silicon tetrachloride to finely divided silicon, forming a silicon melt by melting the finely divided silicon, and forming solid silicon from the silicon melt.

36 Claims, 1 Drawing Sheet

U.S. PATENT DOCUMENTS

| | | | |
|---|---|---|---|
| 4,188,368 A | 2/1980 | Wolf et al. | |
| 4,239,740 A | 12/1980 | Harvey, II et al. | |
| 4,255,463 A | 3/1981 | Rucha et al. | |
| 4,318,942 A | 3/1982 | Woerner et al. | |
| 4,340,574 A | 7/1982 | Coleman | |
| 4,426,408 A | 1/1984 | Dietze | |
| 4,532,090 A | 7/1985 | Dietze et al. | |
| 4,547,258 A | 10/1985 | Witter et al. | |
| 4,612,179 A * | 9/1986 | Sanjurjo et al. | 423/348 |
| 4,676,967 A | 6/1987 | Breneman | |
| 4,710,260 A | 12/1987 | Witter et al. | |
| 4,756,896 A | 7/1988 | Häyhä | |
| 4,891,339 A | 1/1990 | Calcote et al. | |
| 4,994,107 A * | 2/1991 | Flagan et al. | 75/367 |
| 5,021,221 A | 6/1991 | Gould et al. | |
| 5,108,720 A | 4/1992 | Bourbina et al. | |
| 5,156,914 A | 10/1992 | Shih | |
| 5,310,531 A | 5/1994 | Ikeda et al. | |
| 5,498,446 A | 3/1996 | Axelbaum et al. | |
| 5,556,461 A | 9/1996 | Kimura et al. | |
| 5,653,803 A | 8/1997 | Ito | |
| 5,665,159 A | 9/1997 | Fuerhoff | |
| 5,733,368 A | 3/1998 | Nagai et al. | |
| 5,900,055 A | 5/1999 | Nagai et al. | |
| 5,902,395 A | 5/1999 | Nagai et al. | |
| 5,922,299 A | 7/1999 | Bruinsma et al. | |
| 5,994,604 A | 11/1999 | Reagen et al. | |
| 6,022,424 A | 2/2000 | Sellers et al. | |
| 6,045,610 A | 4/2000 | Park et al. | |
| 6,090,360 A | 7/2000 | Herman | |
| 6,113,983 A | 9/2000 | Zachariah et al. | |
| 6,150,549 A | 11/2000 | Minami et al. | |
| 6,254,940 B1 | 7/2001 | Pratsinis et al. | |
| 6,368,915 B1 | 4/2002 | Montree et al. | |
| 6,372,077 B1 | 4/2002 | Tecle | |
| 6,506,251 B1 | 1/2003 | Kitagawa et al. | |
| 6,784,079 B2 | 8/2004 | Wakamatsu et al. | |
| 6,932,954 B2 | 8/2005 | Wakamatsu et al. | |
| 6,940,047 B2 | 9/2005 | Van Kesteren et al. | |
| 2004/0052716 A1* | 3/2004 | Wakamatsu et al. | 423/350 |

FOREIGN PATENT DOCUMENTS

WO     WO 02/100776 A1     12/2002

OTHER PUBLICATIONS

Ceccaroli et al., "Solar Grade Silicon Feedstock," *Handbook of Photovoltaic Science and Engineering* (Luque et al., eds.), 153-204 (John Wiley & Sons, Ltd. 2003).

Oda, *Process for Manufacturing Polycrystalline Silicon with High Yield*, Chemical Abstracts Service Database Accession No. 130: 170273 (Mar. 20, 1999).

Petrov et al., *Method of Producing Polycrystalline Silicon in Closed Circuit*, Derwent Abstract Accession No. 2000-180840 (Dec. 10, 1998).

* cited by examiner

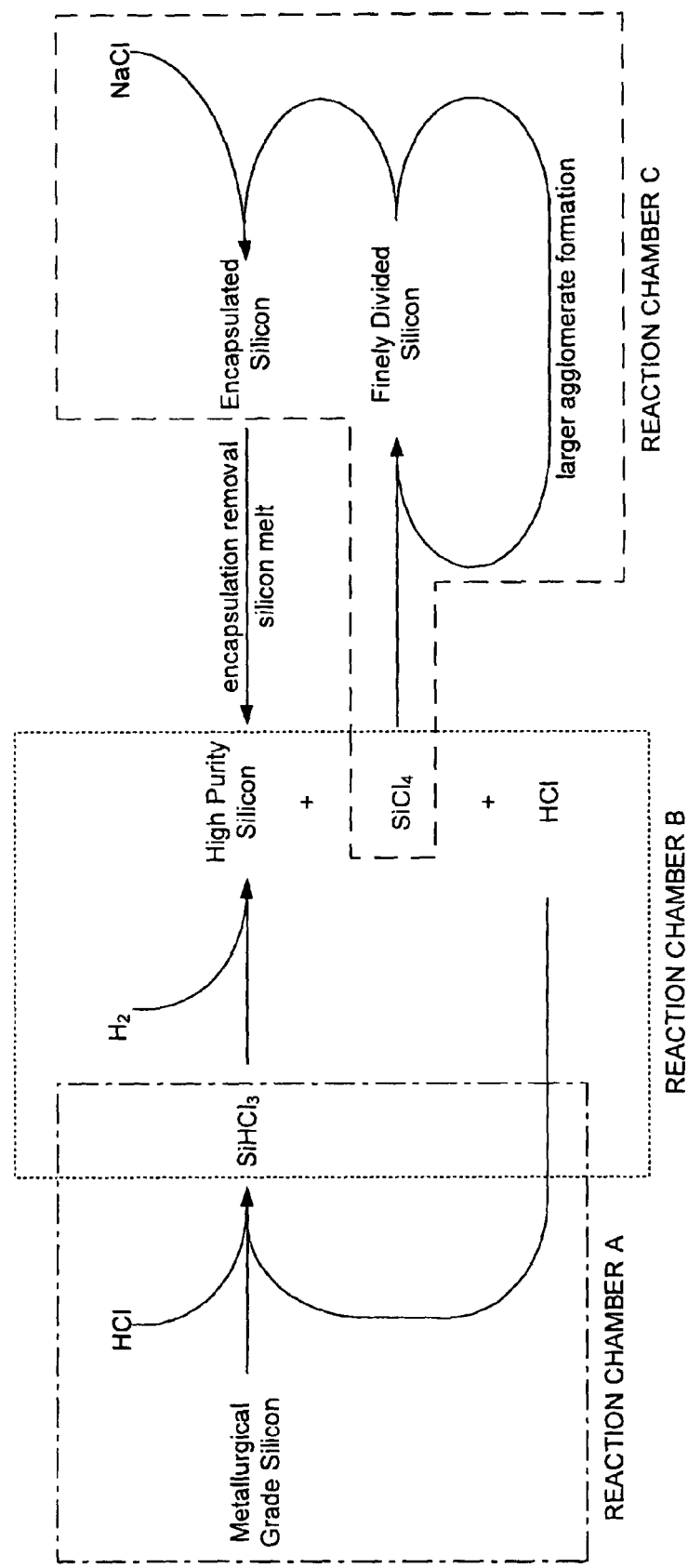

PRODUCTION OF SILICON THROUGH A CLOSED-LOOP PROCESS

CROSS-REFERENCE TO RELATED APPLICATIONS

This patent application claims the benefit of U.S. Provisional Patent Application No. 60/791,640, filed Apr. 13, 2006 (the entire contents of which are incorporated by reference herein).

FIELD OF THE INVENTION

This invention pertains to a method for preparing solid high purity silicon.

BACKGROUND OF THE INVENTION

High-purity elemental silicon is used in the manufacture of electronic semiconductors and solar cells. Various methods have been used for the production of high-purity silicon. For example, the Siemens process is a well-known method for the production of elemental silicon from trichlorosilane. However, the process is highly energy-consuming and creates three to four moles of silicon tetrachloride by-product for every mole of obtained silicon.

Improvements have been made to the original Siemens process. For example, the process disclosed in U.S. Pat. No. 6,932,954 is reported to diminish the amount of silicon tetrachloride by-product formed during pyrolysis of trichlorosilane by conducting the pyrolysis at a higher temperature. However, the amount of silicon tetrachloride produced is still one-third to one-half that produced under the original Siemens process conditions. The silicon tetrachloride by-product that is formed is reduced back to trichlorosilane, which is re-introduced into the system.

A need exists for an even more efficient process for the production of high-purity silicon. The invention described herein provides such a method. This and other advantages of the invention, as well as additional inventive features, will be apparent from the description of the invention provided herein.

BRIEF SUMMARY OF THE INVENTION

The invention pertains to a method of producing silicon comprising (a) providing gaseous trichlorosilane, (b) reacting the gaseous trichlorosilane with hydrogen in the presence of a substrate at a temperature to cause the deposition of silicon onto the substrate and the production of silicon tetrachloride by-product, (c) vaporizing the silicon tetrachloride by-product to form gaseous silicon tetrachloride, (d) converting the gaseous silicon tetrachloride to finely divided silicon having an average primary particle size of about 200 nm or less and an average agglomerate size of about 500 μm or more, (e) forming a silicon melt by melting the finely divided silicon, and (f) forming solid silicon from the silicon melt.

BRIEF DESCRIPTION OF THE DRAWING

The FIGURE is a schematic process diagram showing a typical embodiment of the invention.

DETAILED DESCRIPTION OF THE INVENTION

The invention provides a method of producing silicon, especially high purity silicon, involving the use, e.g., recycling, of one or more by-products to produce the silicon. The high purity silicon preferably is solar cell grade silicon, more preferably semiconductor grade silicon, which also is known as polysilicon. Impurities in the parts per million (ppm), parts per billion (ppb), and/or parts per trillion (ppt) range are required for polysilicon supplied to the solar cell and semiconductor industries. In particular, the high purity silicon produced by the inventive method desirably contains no more than 1 ppm (e.g., no more than 0.1 ppm) of each metallic impurity (such as iron, aluminum, calcium, and titanium), no more than 40 ppm (e.g., no more than 4 ppm) carbon, no more than 50 ppm (e.g., no more than 5 ppm) oxygen, no more than 3 ppm (e.g., no more than 0.3 ppm) boron, and/or no more than 1 ppm (e.g., no more than 0.1 ppm) phosphorus.

The inventive method comprises providing gaseous trichlorosilane and reacting the gaseous trichlorosilane with hydrogen in the presence of a substrate at a temperature to cause the deposition of silicon onto the substrate and the production of silicon tetrachloride by-product. The silicon tetrachloride by-product then is vaporized to form gaseous silicon tetrachloride, which is converted to finely divided silicon. The finely divided silicon desirably has an average primary particle size of 200 nm or less and an average agglomerate size of about 500 μm or more. A silicon melt is formed by melting the finely divided silicon, and solid silicon is produced from the silicon melt.

The trichlorosilane ($SiHCl_3$) can be provided by any suitable source and/or in any suitable manner. For example, the trichlorosilane can be obtained from metallurgical grade silicon. Metallurgical grade silicon has a purity of 99% or greater but contains impurities such as 300 ppm or more (e.g., 300-25,000 ppm) iron, 300 ppm or more (e.g., 300-5,000 ppm) aluminum, 20 ppm or more (e.g., 20-2,000 ppm) calcium, 100 ppm or more (e.g., 100-1,000 ppm) titanium, 50 ppm or more (e.g., 50-1,500 ppm) carbon, 100 ppm or more (e.g., 100-5,000 ppm) oxygen, 5 ppm or more (e.g., 5-70 ppm) boron, and/or 5 ppm or more (e.g., 5-100 ppm) phosphorus. Other impurities in metallurgical grade silicon typically are 5 ppm or more (e.g., 5-200 ppm) magnesium, 10 ppm or more (e.g., 10-300 ppm) manganese, 1 ppm or more (e.g., 1-300 ppm) vanadium, 5 ppm or more (e.g., 5-100 ppm) copper, 5 ppm or more (e.g., 5-150 ppm) chromium, 10 ppm or more (e.g., 10-100 ppm) nickel, 5 ppm or more (e.g., 5-300 ppm) zirconium, and/or 1 ppm or more (e.g., 1-10 ppm) molybdenum.

To obtain trichlorosilane from metallurgical grade silicon, generally hydrogen chloride can be passed through a bed of the metallurgical grade silicon, optionally in the presence of a suitable catalyst, such as a copper-containing catalyst, at a temperature of about 400° C. or lower. The resulting reaction yields trichlorosilane and hydrogen. Preferably, the reaction is performed at about 300° C. Impurities can be removed from the produced trichlorosilane by fractionation and vaporization. Examples of the preparation of trichlorosilane from metallurgical grade silicon are described in U.S. Pat. No. 4,092,446, 4,340,574, and 6,932,954.

If not already gaseous, the trichlorosilane can be rendered gaseous by any suitable technique. For example, liquid trichlorosilane can be vaporized by exposure to a sufficiently high temperature environment.

The trichlorosilane desirably contains no more than 10 ppm per each metallic impurity (such as iron, aluminum, calcium, and titanium), no more than 400 ppm carbon, no more than 500 ppm oxygen, no more than 30 ppm boron, and/or no more than 10 ppm phosphorus. Preferably, the trichlorosilane contains no more than 1 ppm per each metallic impurity (such as iron, aluminum, calcium, and titanium), no more than 40 ppm carbon, no more than 50 ppm oxygen, no more than 3 ppm boron, and/or no more than 1 ppm phosphorus.

The gaseous trichlorosilane is reacted with hydrogen in the presence of a substrate at a temperature to produce silicon, which is deposited onto the substrate. The molar ratio of hydrogen to trichlorosilane can be any suitable amount, although typically hydrogen is used in much greater molar excess to trichlorosilane. The hydrogen:trichlorosilane molar ratio desirably is about 9:1 to about 20:1.

The reaction of the trichlorosilane and hydrogen gases can be carried out in any suitable manner. For example, the trichlorosilane and hydrogen gases can be fed into a reaction chamber containing a substrate for the deposited silicon. The trichlorosilane and hydrogen gases desirably are mixed together and enter such a reaction chamber through a single feed line.

The flow rate and composition of the trichlorosilane and hydrogen reaction gas mixture as it enters the reaction chamber desirably are adjusted during the reaction process to maintain a suitable deposition rate of the silicon on the substrate during the reaction process. Desirably, the flow rate and composition of the trichlorosilane and hydrogen reaction gas mixture as it enters the reaction chamber are adjusted during the reaction process so that the rate at which the produced silicon is deposited onto the substrate remains relatively unchanged throughout the reaction process. Preferably, the reaction conditions are such that silicon is deposited on the substrate at a rate of about 0.1 $g/cm^2$ per hour to about 0.5 $g/cm^2$ per hour. Such a silicon deposition rate typically ensures maximal silicon deposition on the substrate without incurring undesired silicon deposition on other surfaces within the reaction chamber.

Typically, the initial velocity of the trichlorosilane and hydrogen reaction gas mixture into the reaction chamber is low and then is gradually increased, resulting in a reduction of the number of lattice defects in the produced silicon. For example, the flow rate of the trichlorosilane and hydrogen reaction gas mixture into the reaction chamber initially can be 0.2 $m^3/hr$ and then can be increased to 2 $m^3/hr$ over 5-15 minutes. A typical process for reacting the trichlorosilane and hydrogen gases is disclosed in U.S. Pat. No. 3,120,451.

The pure silicon produced from the reaction of the trichlorosilane and the hydrogen deposits, e.g., precipitates, onto a substrate. The substrate consists of a carrier material that optionally is coated with silicon. The substrate can be in any suitable shape. For example, the substrate can be in the form of a plate, membrane, ribbon-like strip, rod, drawn wire, or filament. The substrate preferably is rod shaped. The carrier material can be any suitable material. Preferably, the carrier material is graphite, though the carrier material can be comprised of other carbon material. The substrate can have any suitable dimensions prior to the deposition of silicon thereon. The substrate thickness desirably is at least about 0.2 mm thick and preferably is about 0.5 mm to about 1 mm thick.

The substrate, particularly the carrier material portion thereof, can be maintained at any suitable temperature, typically 1400° C. or less, e.g., 1350° C. or less, 1300° C. or less, 1250° C. or less, 1200° C. or less, 1150° C. or less, or 1100° C. or less. Generally, the substrate, particularly the carrier material thereof, is maintained at a temperature of 750° C. or greater, e.g., 800° C. or greater, 850° C. or greater, 900° C. or greater, 950° C. or greater, 1000° C. or greater, 1050° C. or greater, or 1100° C. or greater. Usually, the substrate, particularly the carrier material thereof, is maintained at a temperature of about 1050° C. to about 1250° C.

The substrate, particularly the carrier material thereof, can be maintained at an appropriate temperature in any suitable manner. For example, the substrate, particularly the carrier material thereof, can be heated inductively or by the direct passage of electric current therethrough. Heating the substrate to a temperature above about 1250° C. may elevate the temperature of other surfaces within the reaction chamber, such as a connecting bridge and/or electrodes, such that the deposited silicon may deposit on these other elements or devices.

Accordingly, the temperature of the substrate preferably is maintained at about 1250° C. or less to prevent deposition elsewhere than on the substrate and to ensure easier removal of the silicon from the carrier material. More preferably, the substrate is heated to a temperature of about 1100° C. The pressure at which the reaction takes place is not limited, but preferably the reaction is conducted at ambient atmospheric pressure or higher. Examples of the silicon deposition process are disclosed in U.S. Pat. Nos. 3,146,123, 3,686,378, 3,820, 935, and 4,035,460.

Moreover, the temperature of the inner walls of the reaction chamber are desirably maintained at a temperature, e.g., 300-800° C., during silicon deposition to minimize the formation of a coating of high molecular weight silicon chloride compounds on the inner walls of the reaction chamber. These compounds are hard to remove from the sides of the reaction chamber, trap valuable silicon within them, and are self-ignitable in air. Thus, the formation of these high molecular weight silicon chloride compounds desirably is minimized. It is preferred for the temperature of the inner walls of the reaction chamber to be about 300° C. at the start of the reaction and remain approximately at the same temperature for the duration of the reaction. Examples of the reaction vessel heating process are disclosed in U.S. Pat. Nos. 2,999, 735, 3,042,494, and 4,148,931.

As the thickness of the layer of deposited silicon on the substrate increases during the course of the reaction, the temperature of the reaction chamber may increase. The reaction chamber temperature desirably is monitored, and the reaction chamber desirably is cooled accordingly to prevent silicon deposition anywhere but on the substrate. To control the temperature, a coolant gas can be introduced into the reaction chamber. A reaction gas, e.g., trichlorosilane or hydrogen, can be used as the cooling gas, e.g., introduced through a separate inlet line. Cooling of the reaction chamber also can be achieved by circulating a coolant gas, such as hydrogen, through the carrier.

The silicon deposition reaction is allowed to continue until a silicon coating of a desired thickness is attained on the substrate. At that point, the substrate is removed from the reaction chamber. The heating of the reaction chamber and the addition of reaction gases can be stopped in a batch process to allow for replacement of the carrier, or the reaction can proceed as a continuous process with the carrier being replaced on a continuous basis. The control of the conditions during the silicon deposition reaction are further described in U.S. Pat. Nos. 3,686,378 and 3,820,935.

The silicon, typically after it has cooled, is removed from the carrier material. Any suitable method can be used to remove the silicon from the carrier material. If the carrier material is graphite or some other easily combustible material, the carrier material can be burned in air or in an oxygen-rich atmosphere. Alternatively, the silicon-covered carrier can be heated to facilitate mechanical separation of the silicon from the carrier material. A carrier material with a thermal coefficient of expansion greater than silicon can be utilized to separate the silicon from the carrier material. In that respect, at some intermediate stage of the silicon deposition process, the carrier is heated to an elevated temperature to cause expansion of the carrier material. Cracks and fissures caused in the deposited silicon due to this expansion are filled in during further silicon deposition. After allowing the deposited silicon and carrier to cool, the carrier contracts and can be removed by allowing it to drop away from the deposited silicon. Preferably, the carrier is removed by disintegrating the carrier material with a concentrated highly oxidizing acid. If the carrier is graphite, 100% fuming nitric or chromosulfuric acid can be used to disintegrate the carrier material. After disintegration of the carrier material, the powder-like residue of the carrier material can be removed by various means. Preferably, the residue is removed with a water flush immediately after disintegration. Carrier removal processes are further described in U.S. Pat. Nos. 3,686,378 and 3,900,039.

The silicon separated from the carrier material is high purity silicon. The high purity silicon can be in any suitable form, e.g., a single piece or multiple pieces. Desirably, the silicon is in a form which facilitates subsequent processing to further enhance the purity of the high purity silicon.

The reaction of gaseous trichlorosilane and hydrogen to produce silicon results in the production of a number of by-products. Such by-products include silicon tetrachloride ($SiCl_4$), hydrogen chloride (HCl), and other chlorosilanes. The by-products, as well as unreacted trichlorosilane ($SiHCl_3$) and hydrogen ($H_2$), are separated from the deposited silicon in any suitable manner. For example, such by-products can be removed from a reaction chamber containing the substrate with the deposited silicon by way of an exhaust tube. The exhausted by-products, in particular, hydrogen chloride, can be monitored by any suitable method. Based on the hydrogen chloride output, both the composition and velocity of the trichlorosilane and hydrogen reaction gas mixture into the reaction chamber can be adjusted to maintain a suitable deposition rate of the produced silicon onto the substrate. Examples of processes for the monitoring of the silicon deposition and the exhausted gas removal are described in U.S. Pat. Nos. 3,820,935, 3,979,490, and 4,148,931.

The exhaust gases produced from the reaction of trichorosilane and hydrogen are separated for use in other reactions. Hydrogen chloride and silicon tetrachloride are the predominant by-products of the silicon deposition reaction. Cooling the exhaust gas mixture allows for separation of the hydrogen chloride gas from condensed chlorosilanes. This cooling can be achieved through any suitable method, for example through a cooled heat exchanger. The exhaust gas preferably is cooled to 10° C. or lower, more preferably −10° C. or lower. The hydrogen chloride gas, which may contain some hydrogen gas, can be used to generate trichlorosilane from metallurgical grade silicon as described above.

The residue from the condensation of the exhaust gases can be purified, e.g., by distillation. For example, silicon tetrachloride can be separated from small amounts of leftover trichlorosilane, other chlorosilanes, oligomers thereof, and heavy metals by distillation in which lower chlorosilanes generally are collected first, leaving silicon tetrachloride. Further, the silicon tetrachloride itself can be purified by distillation at 59° C., removing any other impurities that may exist. An example of a similar method to separate light gases from chlorosilanes is described in U.S. Pat. No. 6,932,954.

The silicon tetrachloride by-product is vaporized to form gaseous silicon tetrachloride. The vaporization can be accomplished in any suitable manner. For example, the silicon tetrachloride by-product can be directed to a vaporizer, where it is converted to gas by heating it to 60° C. or above.

The gaseous silicon tetrachloride then is converted to finely divided silicon. The finely divided silicon typically will have a structure that comprises agglomerates. As is well known in the art, primary particles are formed by covalent bonds between atoms comprising the particles and are stable to all but the harshest conditions. At the next level of structure, primary particles are associated into secondary particles, generally referred to as aggregates. Aggregate particles comprise primary particles, are bonded together by covalent bonds, and typically are resistant to degradation by mechanical energy inputs such as high-shear mixing. At the next level of structure, aggregates are relatively loosely bonded together to form agglomerates. Typically, agglomerates can be disassociated into the constituent aggregates via mechanical energy inputs, e.g., with high shear mixing.

The primary particles, aggregates, and agglomerates can have any suitable shapes, e.g., shapes ranging from spherical to elliptical. The aggregates typically will have extended, chain-like structures. The size of a particle (whether with respect to primary particles, aggregate particles, or agglomerate particles) refers to the diameter of the smallest sphere that encompasses the particle. The finely divided silicon desirably has an average primary particle size of about 200 nm or less (e.g., about 100 nm or less, or about 50 nm or less). Typically, the finely divided silicon has an average primary particle size of about 10 nm or more (e.g., about 20 nm or more, about 30 nm or more, about 40 nm or more, or about 50 nm or more). The finely divided silicon has an average aggregate particle size that necessarily is at least as large as the primary particle size and desirably is not more than about 3, preferably not more than about 2, times the average primary particle size. Most preferably, the average aggregate particle size is not more than about 1.5 (e.g., not more than about 1.4, not more than about 1.3, not more than about 1.2, or not more than about 1.1) times the average primary particle size. The finely divided silicon optimally has an average aggregate particle size substantially the same as, e.g., identical to, the average primary particle size. The finely divided silicon desirably has an average agglomerate size of about 500 µm or more (e.g., about 600 µm or less, about 700 µm or more, or about 800 µm or more).

The conversion of the gaseous silicon tetrachloride to finely divided silicon can be carried out in any suitable manner. For example, the silicon tetrachloride can be fed to a reaction chamber where it is thermally decomposed to silicon. Thermal decomposition includes, but is not limited to, conventional heating within a reaction chamber, use of arc heaters, flame synthesis, and rapid plasma quench technology.

The thermal decomposition desirably occurs in the presence of an inert diluent and/or zero to 100 ppm by weight oxygen. The thermal decomposition of silicon tetrachloride also desirably occurs in the presence of previously formed finely divided silicon, i.e., silicon particles already formed by the thermal decomposition. In this manner, finely divided silicon of larger agglomerate size can be formed. This process loop provides previously formed finely divided silicon to be fed back into the gaseous silicon tetrachloride thermal decomposition process and can be continued until the desired agglomerate size for the finely divided silicon is achieved as described above.

The gaseous silicon tetrachloride optionally can be converted to the finely divided silicon by being decomposed in the presence of a reducing agent. The reducing agent can be any suitable reducing agent. Preferably, the reducing agent is a gaseous alkali metal. More preferably, the alkali metal is sodium. The gaseous silicon tetrachloride and gaseous reducing agent desirably are mixed in a reaction chamber in the presence of zero to 100 ppm by weight oxygen resulting in silicon and gaseous salt formed from the reducing agent and chloride ions.

The thermal decomposition of silicon tetrachloride in the presence of a reducing agent can be carried out in any suitable manner. For example, the gaseous silicon tetrachloride and a gaseous reducing agent can be fed to a reaction chamber through separate inlet ports where the two components are mixed. Similar to the silicon tetrachloride, the reducing agent desirably is vaporized before entering the reaction chamber. The reaction chamber also desirably contains an exit port and a means for controlling the temperature of the reaction chamber. The reaction preferably is performed in the presence of zero to 100 ppm by weight oxygen. The reaction temperature preferably is maintained at about 1800° C. to about 2100° C. The reaction can be quenched by introducing an inert gas or hydrogen to the thermal decomposition reaction chamber or by expansion of gaseous reagents through a nozzle, e.g., a supersonic nozzle. The reaction pressure desirably is maintained at about 0.1 to 0.5 atm, preferably at about 0.25 atm. An example of a process involving the thermal decomposition of silicon tetrachloride in the presence of a reducing agent is described in U.S. Pat. No. 5,021,221.

The conversion of the gaseous silicon tetrachloride to finely divided silicon also can be accomplished through use of an arc heater, as described in U.S. Pat. No. 4,102,765. In a typical such process, the gaseous silicon tetrachloride and gaseous reducing agent are fed into an arc stream of inert gas, generated by up to three arc heaters, each with a power level of up to 35 kW. The reaction is performed in the presence of zero to 100 ppm by weight oxygen. Once leaving the arc stream, the reaction products are projected into a reaction chamber.

Alternatively, the gaseous silicon tetrachloride and gaseous reducing agent can be reacted in a flame. Preferably, this flame reaction is within the environment of an inert gas, e.g., argon, flow to prevent product deposition at the burner mouth. The environment also desirably contains zero to 100 ppm by weight oxygen. The flame temperature should be kept low, preferably below 1700° C. Such a procedure is described in more detail in U.S. Pat. No. 5,498,446.

The finely divided silicon resulting from the conversion of the gaseous silicon tetrachloride to finely divided silicon can be collected in any suitable manner. The finely divided silicon can contain a salt of the reducing agent if a reducing agent was present during the thermal decomposition of the gaseous silicon tetrachloride. For those reaction product mixtures containing both silicon and salt, the reaction products can be collected separately or together, especially when the reaction products comprise salt-encapsulated silicon. The reaction products can be discharged from the reaction chamber so as to allow for separation of the finely divided silicon from gaseous products. For example, the finely divided silicon can be deposited on a downwardly extending surface to allow the silicon to be collected separately from other reaction products. An example of such a method is described in U.S. Pat. No. 4,139,438. Alternatively, the finely divided silicon can be collected on a surface and separated from the gaseous salt following shock wave impaction separation, as disclosed in U.S. Pat. No. 5,021,221.

The finely divided silicon produced from the thermal decomposition of silicon tetrachloride can be collected as salt-encapsulated particles. The salt is derived from the reducing agent and chloride counterions from the silicon tetrachloride. Alkali salts are preferred, with sodium chloride-encapsulated finely divided silicon being particularly preferred. If a reducing agent is not used in the thermal decomposition of silicon tetrachloride to produce the finely divided silicon, then gaseous salt, e.g., sodium chloride, can be injected into the silicon tetrachloride thermal decomposition reaction chamber to cause the formation of salt-encapsulated silicon. The size of the silicon particles encapsulated by the gaseous alkali salt can be controlled through control of the temperature of the reaction chamber. At a particular temperature and gaseous salt partial pressure, a silicon particle will grow to a certain size, at which point subsequent silicon particle growth will cause the condensation rate for the salt to increase rapidly, thereby effectively stopping further silicon particle growth and causing the salt to condense onto the surface of the silicon particle to form salt-encapsulated silicon. Desirably, the salt-encapsulated silicon has the previously described particle size characteristics of the finely divided silicon. The encapsulation of particles by alkali salts is further described in U.S. Pat. No. 5,498,446.

The encapsulation of the finely divided silicon is preferable for two reasons. First, it protects the finely divided silicon from outside environmental effects such as oxidation. Second, encapsulation allows for the easier handling of small particles. The salt-encapsulated silicon can be the final product, or the encapsulating salt can be removed from the silicon. The salt can be removed by any suitable method. For example, the salt can be washed away with a liquid, such as water or glycerin. The salt can be removed by sublimation, e.g., at temperatures of about 500° C. or more (e.g., about 600° C. or more, about 700° C. or more, or about 800° C. or more) and about 1100° C. or less (e.g., about 1000° C. or less, or about 900° C. or less). In a preferred embodiment, the encapsulating salt is sodium chloride, and the salt is removed by sublimation at a temperature of about 600° C. to about 1000° C. (preferably at 800° C.). Alternatively, the salt can be vaporized, leaving the finely divided silicon.

The finely divided silicon, whether obtained directly or via salt-encapsulation, desirably is formed, e.g., densified, into pellets for ease of subsequent handling. The pelleting process can be carried out in any suitable manner, such as by way of a dry-drum compaction process. Preferably, the silicon pelleting process is performed with minimum oxygen contamination of the silicon, such as under an inert, e.g., nitrogen or argon, blanket or atmosphere. The resulting silicon pellets can have any suitable average particle size, desirably about 1 mm or more.

In addition to finely divided silicon, gaseous by-products result from the thermal decomposition of silicon tetrachloride. Chlorine and unreacted silicon tetrachloride, along with any other impurities, can be removed and purified. The purified chlorine can be reacted with hydrogen to produce hydrogen chloride, which subsequently can be used to generate trichlorosilane from metallurgical grade silicon as previously described. The purified silicon tetrachloride can be combined with the silicon tetrachloride by-product of the trichlorosilane reduction process (whereby silicon is deposited on a substrate) and used as feedstock for the thermal decomposition of silicon tetrachloride to form finely divided silicon as previously described.

The finely divided silicon, whether or not in pellet form, is high purity silicon. Other than being essentially in powdered from, the finely divided silicon is similar to the high purity silicon produced from the trichlorosilane reaction with hydrogen. A silicon melt is formed by melting the finely divided silicon, and then solid silicon is formed by cooling the silicon melt. If desired, the high purity silicon produced from the trichlorosilane reaction with hydrogen can be combined with the finely divided silicon to form the silicon melt and solid silicon. There are many known processes that can be used to form solid silicon from the finely divided silicon and/or the high purity silicon produced from the trichlorosilane reaction with hydrogen, and these processes also can be used to enhance the purity of the solid silicon. Two such well-known methods are the Czochralski method and the floating zone method.

In the Czochralski method, the silicon is transformed to the molten state in a crucible. A rod with a single silicon seed crystal at the tip is lowered into the molten silicon then slowly pulled back up while rotating the rod in one direction and the crucible in another. Dislocations that can arise in the growing crystal, for example due to the thermal shock of contacting the seed to the silicon melt, are eliminated by first pulling a crystal length of very small diameter before pulling the body of the crystal of a usually larger diameter out of the molten state. The crystal becomes solid as it leaves the surface of molten silicon. After pulling the body of the crystal with the desired diameter, a tail portion of the silicon crystal is formed, and the process is complete. The body of the crystal then can be sliced and polished as desired. Detailed descriptions of the Czochralsld method can be found in U.S. Pat. Nos. 5,665,159, 5,733,368, 5,902,395, and 6,045,610.

In the float zone method silicon, desirably in the shape of a rod, is mounted in a vertical chamber. A heating device, for example a heating coil with a diameter smaller than that of the rod so that it can penetrate the rod, is moved through the rod. As the coil passes beyond a given segment of silicon rod, it melts the silicon and then leaves it to cool again. The impurities travel with the molten silicon, leaving the solidified silicon with a higher purity. Heating along the rod can be repeated, if desired. The end piece of the now monocrystalline silicon, which desirably contains most impurities captured during the heating process, is removed from the rest of the monocrystalline rod. The rod can be sliced and polished as desired. Examples of this method are detailed in U.S. Pat. Nos. 5,310,531 and 5,556,461.

EXAMPLE

This example further illustrates the invention but, of course, should not be construed as in any way limiting its scope.

A process diagram of a typical embodiment of the described invention is depicted in the FIGURE. With reference to the FIGURE, hydrogen chloride is added to Reaction Chamber A, wherein it is passed through a bed of metallurgical grade silicon at a temperature of about 300° C. The produced trichlorosilane gas is removed from Reaction Chamber A by a gas feed line. The trichlorosilane gas is cooled, and the resulting trichlorosilane liquid is subjected to fractional distillation to form purified trichlorosilane.

The purified trichlorosilane is vaporized and mixed with hydrogen gas in a hydrogen to trichlorosilane molar ratio of about 10:1. The trichlorosilane and hydrogen reaction gas mixture is fed into Reaction Chamber B through a gas feed line. Reaction Chamber B contains a deposition substrate, which is a rod-shaped carrier composed of graphite covered by a thin layer of pure silicon. The deposition substrate is heated to about 1100° C. before the trichlorosilane and hydrogen reaction gas mixture enters Reaction Chamber B. The trichlorosilane and hydrogen reaction gas mixture enters Reaction Chamber B at an initial flow rate of about 0.2 m$^3$/hr., and over 10 minutes the flow rate is increased to 2 m$^3$/hr.

In Reaction Chamber B, the reaction of the trichlorosilane and the hydrogen results in the deposition of silicon onto the deposition substrate and the production of gaseous by-products. During the reaction, the walls of Reaction Chamber B are maintained at a temperature of no greater than about 300° C. To prevent higher temperatures, the walls are cooled by the circulation of chilled water through a water jacket enveloping Reaction Chamber B. The deposition rate of silicon onto the deposition substrate reaches a maximum at about 0.5 g/cm$^2$ per hour. The composition and flow rate of the trichlorosilane and hydrogen reaction gas mixture are adjusted as needed to maintain a suitable silicon deposition rate.

The deposited silicon from Reaction Chamber B is separated from the deposition substrate by reacting the deposition substrate with fuming nitric acid to remove the graphite carrier and thereby leave a rod of pure polysilicon closed at one end.

The reaction of the trichlorosilane and the hydrogen results in the production of not only silicon but also gaseous by-products, which primarily comprise hydrogen chloride and silicon tetrachloride. The gaseous by-products are removed from Reaction Chamber B in the form of exhaust gas. The exhaust gas passes through a beam of monochromatic light set to a wavelength which coincides with an absorption peak or band of hydrogen chloride. By monitoring changes in the intensity of the monochromatic light after having passed through the exhaust gas, the hydrogen chloride output from Reaction Chamber B can be monitored. The exhaust gas is collected, cooled, and fractionally distilled to separate hydrogen chloride, silicon tetrachloride, and other impurities. The hydrogen chloride is recycled by being fed back to Reaction Chamber A where it reacts with the metallurgical grade silicon and produces trichlorosilane.

The purified silicon tetrachloride is vaporized in a vaporizer and fed into Reaction Chamber C, wherein the silicon tetrachloride is thermally decomposed to form finely divided silicon. The interior walls of Reaction Chamber C are heated to a temperature of about 2200° C., and the temperature inside Reaction Chamber C at which the thermal decomposition of silicon tetrachloride takes place is about 1900° C. The resulting silicon is left in Reaction Chamber C as a continuous stream of silicon tetrachloride is fed into Reaction Chamber C. Once the average agglomerate size of the produced silicon has reached about 500 µm, gaseous sodium chloride is injected into Reaction Chamber C. Sodium chloride encapsulation of the finely divided silicon ensues, and the sodium chloride-encapsulated silicon is collected from Reaction Chamber C.

The sodium chloride-encapsulated silicon is washed with water to remove the sodium chloride encapsulation material and yield a finely divided silicon, which essentially is a powdered form of polysilicon. The finely divided silicon is melted to form a silicon melt, and then cooled to form a pure polysilicon rod.

The pure polysilicon rods produced from the reaction of trichlorosilane and hydrogen in Reaction Chamber B and the thermal decomposition of silicon tetrachloride in Reaction Chamber C are subsequently treated in the same manner. In particular, each pure polysilicon rod is converted to monocrystalline solid silicon of high purity using the float zone method. The pure polysilicon rod is attached to a first vertical shaft. A silicon seed crystal is attached to a second vertical shaft, which is positioned directly beneath the first vertical shaft attached to the pure polysilicon rod. The first vertical shaft attached to the pure polysilicon rod slowly passes through a ring-shaped induction heating coil, which melts a section of the pure polysilicon rod. This molten section of the pure polysilicon rod is fused to the silicon seed crystal, and both the first and second vertical shafts move downward vertically as subsequent sections of the pure polycrystalline rod pass through the induction heating coil. A static magnetic field of 700 gauss is also applied to the rod as it passes through the induction coil. Both the first and second vertical shafts are rotated as the pure polysilicon rod passes through the induction coil and subsequently cools once outside the heating coil. After the entire pure polysilicon rod has passed through the induction coil and static magnetic field, impurities built up at the end of the pure silicon rod are removed, and the resulting monocrystalline silicon ingot is sliced and polished.

All references cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of producing silicon, comprising:
   (a) providing gaseous trichlorosilane,
   (b) reacting the gaseous trichlorosilane with hydrogen in the presence of a substrate at a temperature to cause the deposition of silicon onto the substrate and the production of silicon tetrachloride by-product,
   (c) vaporizing the silicon tetrachloride by-product to form gaseous silicon tetrachloride,
   (d) directly converting the gaseous silicon tetrachloride to finely divided silicon having an average primary particle size of about 200 nm or less and an average agglomerate size of about 500 μm or more,
   (e) forming a silicon melt by melting the finely divided silicon, and
   (f) forming solid silicon from the silicon melt.

2. The method of claim 1, wherein the silicon deposited on the substrate comprises no more than 1 ppm of each metallic impurity, no more than 40 ppm carbon, no more than 50 ppm oxygen, no more than 3 ppm boron, and no more than 1 ppm phosphorus.

3. The method of claim 2, wherein the solid silicon formed from the silicon melt comprises no more than 1 ppm of each metallic impurity, no more than 40 ppm carbon, no more than 50 ppm oxygen, no more than 3 ppm boron, and no more than 1 ppm phosphorus.

4. The method of claim 3, wherein the finely divided silicon comprises no more than 1 ppm of each metallic impurity, no more than 40 ppm carbon, no more than 50 ppm oxygen, no more than 3 ppm boron, and no more than 1 ppm phosphorus.

5. The method of claim 1, wherein the silicon deposited on the substrate, the silicon formed from the silicon melt, and/or the finely divided silicon comprises no more than 0.1 ppm of each metallic impurity, no more than 4 ppm carbon, no more than 5 ppm oxygen, no more than 0.3 ppm boron, and no more than 0.1 ppm phosphorus.

6. The method of claim 1, wherein the trichlorosilane comprises no more than 10 ppm per metallic impurity, 400 ppm carbon, 500 ppm oxygen, 30 ppm boron, and 10 ppm phosphorus.

7. The method of claim 6, wherein the trichlorosilane comprises no more than 1 ppm per metallic impurity, 40 ppm carbon, 50 ppm oxygen, 3 ppm boron, and 1 ppm phosphorus.

8. The method of claim 1, wherein the temperature at which the gaseous trichlorosilane is reacted with hydrogen is about 1050° C. to about 1250° C.

9. The method of claim 1, wherein the method further comprises isolating the deposited silicon from the substrate.

10. The method of claim 1, wherein the substrate is either (1) silicon supported on a carrier material or (2) graphite.

11. The method of claim 10, wherein the carrier material is removed with an oxidizing agent.

12. The method of claim 1, wherein the method further comprises melting the deposited silicon obtained in step (b).

13. The method of claim 12, wherein the method further comprises forming solid silicon from the melted deposited silicon obtained in step (b).

14. The method of claim 12, wherein the melted deposited silicon is combined with the silicon melt of step (e).

15. The method of claim 1, wherein the reaction of gaseous trichlorosilane with hydrogen produces gaseous hydrogen chloride by-product.

16. The method of claim 15, wherein the gaseous hydrogen chloride by-product is added to metallurgical grade silicon to produce trichlorosilane.

17. The method of claim 1, wherein step (d) comprises:
   (d1) converting the gaseous silicon tetrachloride to silicon particles having an average primary particle size of about 200 nm or less and an average agglomerate size of about 500 μm or less, and
   (d2) converting the silicon particles obtained in step (d1) to finely divided silicon having an average primary particle size of about 200 nm or less and an average agglomerate size of about 500 μm or more.

18. The method of claim 17, wherein step (d2) comprises repeating step (d1) with the addition of the silicon particles obtained in a prior step (d1).

19. The method of claim 1, wherein the finely divided silicon is densified prior to forming a silicon melt.

20. The method of claim 1, wherein directly converting the gaseous silicon tetrachloride comprises thermally decomposing the gaseous silicon tetrachloride, optionally in the presence of an inert diluent, in the presence of zero to 100 ppm by weight oxygen.

21. The method of claim 1, wherein directly converting the gaseous silicon tetrachloride comprises reacting the gaseous silicon tetrachloride in the presence of a reducing agent in the presence of zero to 100 ppm by weight oxygen.

22. The method of claim 19, wherein the densification of the finely divided silicon comprises forming the finely divided silicon into pellets.

23. The method of claim 20, wherein the thermal decomposition of gaseous silicon tetrachloride produces gaseous chlorine by-product.

24. The method of claim 23, wherein the gaseous chlorine by-product is reacted with hydrogen to produce hydrogen chloride.

25. The method of claim 24, wherein the hydrogen chloride produced from the gaseous chlorine by-product is added to silicon to produce trichlorosilane.

26. The method of claim 20, wherein the thermal decomposition of the gaseous silicon tetrachloride takes place in a reaction chamber into which is injected gaseous sodium chloride.

27. The method of claim 26, wherein the gaseous sodium chloride condenses and encapsulates the silicon to form sodium chloride-encapsulated silicon particles.

28. The method of claim 27, wherein silicon is separated from the sodium chloride.

29. The method of claim 21, wherein the reducing agent is a vaporized alkali metal.

30. The method of claim 29, wherein the alkali metal is sodium.

31. The method of claim 30, wherein the reaction of the silicon tetrachloride by-product with sodium produces gaseous sodium chloride.

32. The method of claim 31, wherein the gaseous sodium chloride condenses and encapsulates the silicon to form sodium chloride-encapsulated silicon particles.

33. The method of claim 32, wherein silicon is separated from the sodium chloride.

34. The method of claim 20, wherein unreacted gaseous silicon tetrachloride is removed from the thermal decomposition reaction.

35. The method of claim 34, wherein the removed unreacted gaseous silicon tetrachloride is purified and utilized as feedstock for the step of converting the gaseous silicon tetrachloride by thermally decomposing the gaseous silicon tetrachloride, optionally in the presence of an inert diluent, in the presence of zero to 100 ppm by weight oxygen.

36. The method of claim 20, wherein the direct conversion of the gaseous silicon tetrachloride is quenched by contact with an inert gas or hydrogen or by expansion of gaseous reagents through a nozzle.

\* \* \* \* \*